US008893057B2

(12) United States Patent
Jung et al.

(10) Patent No.: US 8,893,057 B2
(45) Date of Patent: Nov. 18, 2014

(54) METHOD FOR CHANGING AND ROTATING A MOBILE TERMINAL STANDBY SCREEN

(75) Inventors: Hee-Won Jung, Suwon-si (KR); Jong-Hee Kim, Seongnam-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1132 days.

(21) Appl. No.: 11/982,689

(22) Filed: Nov. 2, 2007

(65) Prior Publication Data

US 2008/0115091 A1 May 15, 2008

(30) Foreign Application Priority Data

Nov. 9, 2006 (KR) ................................ 2006-110649

(51) Int. Cl.
*G06F 3/041* (2006.01)
*G06F 3/01* (2006.01)
*G06F 1/16* (2006.01)
*G06F 3/048* (2013.01)
*G06F 3/0488* (2013.01)

(52) U.S. Cl.
CPC .............. *G06F 1/1626* (2013.01); *G06F 3/048* (2013.01); *G06F 2200/1614* (2013.01); *G06F 3/0416* (2013.01); *G06F 1/169* (2013.01); *G06F 3/04883* (2013.01)
USPC ........................................ 715/867; 345/174

(58) Field of Classification Search
USPC .......................................... 715/867; 713/323
See application file for complete search history.

(56) References Cited

U.S. PATENT DOCUMENTS

| 5,995,106 | A | * | 11/1999 | Naughton et al. | 715/854 |
| 6,091,031 | A | * | 7/2000 | Lee et al. | 178/18.01 |
| 7,030,860 | B1 | * | 4/2006 | Hsu et al. | 345/173 |
| 2003/0011568 | A1 | * | 1/2003 | Yoon et al. | 345/158 |
| 2003/0122787 | A1 | * | 7/2003 | Zimmerman et al. | 345/173 |
| 2004/0104826 | A1 | * | 6/2004 | Philipp | 341/34 |
| 2004/0257385 | A1 | * | 12/2004 | Kim et al. | 345/649 |
| 2005/0146511 | A1 | * | 7/2005 | Hill et al. | 345/173 |
| 2006/0026535 | A1 | * | 2/2006 | Hotelling et al. | 715/863 |
| 2007/0046561 | A1 | * | 3/2007 | Cheon et al. | 345/1.1 |

FOREIGN PATENT DOCUMENTS

| KR | WO 2005/104387 | * | 4/2004 | H04B 1/40 |
| KR | 2005-1134 | | 1/2005 | H04B 1/40 |
| KR | 2006-85850 | | 7/2006 | |

* cited by examiner

*Primary Examiner* — Peiyong Weng
(74) *Attorney, Agent, or Firm* — Cha & Reiter, LLC

(57) ABSTRACT

Disclosed is a mobile terminal having a pressure sensor with a plurality of pressure sensing areas that are used to change or rotate a standby screen image. The pressure sensor detects pressure applied by the user to the pressure sensing areas and outputs corresponding pressure sensing signals. The mobile terminal determines the direction of change or rotation of the standby screen image according to the pressure sensing signals. Upon determining the standby screen image changing direction, the mobile terminal loads and displays one of a plurality of images stored in a memory in the determined direction. Upon determining the direction of rotation of the standby screen image, the mobile terminal rotates the current standby screen image in the determined direction.

7 Claims, 7 Drawing Sheets

METHOD FOR CHANGING AND ROTATING A MOBILE TERMINAL STANDBY SCREEN

CLAIM OF PRIORITY

This application claims the benefit of the earlier filing date, under 35 U.S.C. §119(a), to that patent application entitled "Method for Changing Standby Screen, Method for Rotating Standby Screen, and Mobile Terminal For Same" filed in the Korean Intellectual Property Office on Nov. 9, 2006 and assigned Serial No. 2006-110649, the contents of which are hereby incorporated by reference.

BACKGROUND OF THE INVENTION

1. Field of the Invention

The present invention relates to graphic displays and, in particular, a method and device for controlling the display of a standby screen image in a mobile terminal.

2. Description of the Related Art

The number of users of mobile terminal has grown rapidly in recent years and these mobile terminals have become multifunctional devices capable of implementing various functions or services. Mobile terminals generally have a hierarchical menu structure that allows a user to select a desired function by moving from a higher-level menu to a subordinate menu. A user may set a desired image as the standby screen of their mobile terminals, which may be personal to the user, e.g., pictures of family, children, vacation places, etc. In this connection, a user may select one of a plurality of standby screen images offered by a mobile terminal manufacturer or set a photographed or downloaded image as the standby screen. To change the standby screen image, users generally enter a display menu and a sub-item under the menu to select another one of the images stored in their mobile terminals.

FIG. 1 is a schematic view showing hierarchical menus for selecting a standby screen image. Referring to FIG. 1, a user first selects a main menu 8. The user then selects a display menu 10 among a plurality of individual genre menus of the same hierarchy. With the selection of the display menu 10, lower hierarchy menu items are displayed. When the user selects a standby screen item 20 under the display menu 10, a plurality of standby screen images A, 30, B, 32, C, 34 and D, 36 are displayed. The user can select a desired one of the displayed images and set it as new standby screen image.

The conventional method of changing the standby screen in a mobile terminal uses menus of a hierarchical structure. It is time-consuming and inconvenient to search for and select a standby screen image by moving from a menu of a higher hierarchy to a menu of a lower hierarchy.

As a solution to the above problem, mobile terminals automatically changing the standby screen with the opening or sliding of a folder have been suggested. As another solution, a method for automatic changing the standby screen at a predetermined time interval has been suggested. However, no method has been suggested to easily change the standby screen whenever a user wishes.

SUMMARY OF THE INVENTION

Accordingly, the present invention provides a device and a method for easily changing the standby screen in a mobile terminal.

Also, the present invention provides a device and a method for easily rotating the standby screen in a mobile terminal.

In accordance with an aspect of the present invention, there is provided a mobile terminal capable of changing the standby screen, which includes a memory for storing a plurality of images for standby screen in a predetermined order, a display unit for displaying a standby screen image; a pressure sensor having a predetermined number of pressure sensing areas on the surface of the display unit to detect pressure applied thereto and to generate corresponding pressure sensing signals and a control unit for receiving the pressure sensing signals, determining a standby screen image changing direction according to the received signals, loading one of the plurality of images stored in the memory in the determined direction, and displaying the loaded image.

In accordance with another aspect of the present invention, there is provided a mobile terminal capable of rotating the standby screen, which includes: a display unit for displaying a standby screen image, a pressure sensor having a predetermined number of pressure sensing areas on the surface of the display unit to detect pressure on the pressure sensing areas and to generate corresponding pressure sensing signals and a control unit for receiving the pressure sensing signals, determining a direction of rotation of the standby screen image, and rotating the standby screen image currently displayed on the display unit by a predetermined angle in the determined direction.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
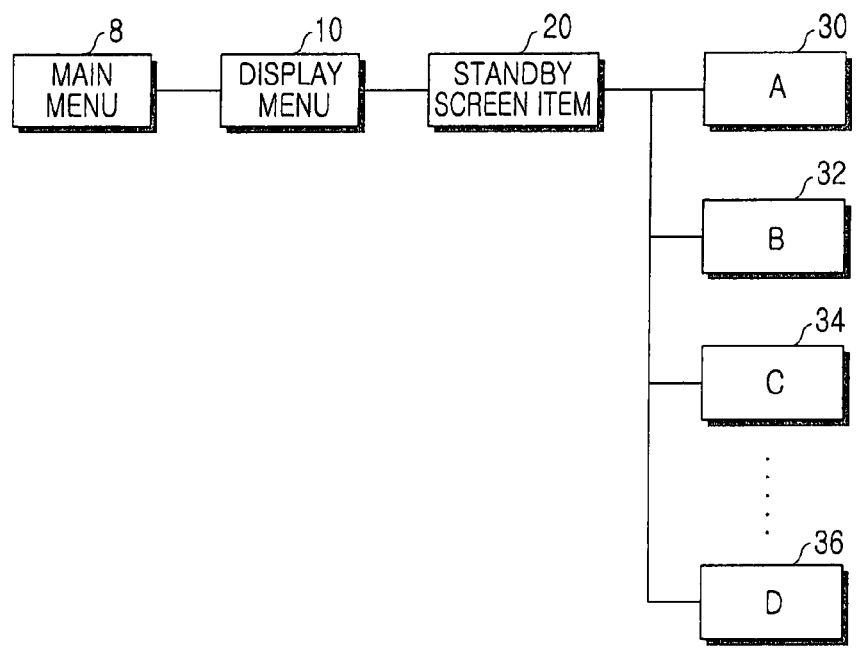
FIG. 1 is a schematic view showing hierarchical menus for selecting a standby screen image.

Hereinafter, embodiments of the present invention will be described with reference to the accompanying drawings. In the following description, the same elements will be designated by the same reference numerals although they are shown in different drawings. For the purposes of clarity and simplicity, in the following description of the present invention, a detailed description of known functions and configurations incorporated herein will be omitted as it may make the subject matter of the present invention rather unclear.

The present invention describes a mobile terminal having a pressure sensor with a plurality of pressure sensing areas which are used to change or rotate a standby screen image.

The pressure sensor detects pressure applied by the user to the pressure sensing areas and outputs corresponding pressure sensing signals. The mobile terminal determines the direction of change or rotation of the standby screen image according to the pressure sensing signals. Upon determining the standby screen image changing direction, the mobile terminal loads and displays one of a plurality of images stored in a memory according to the determined direction. Upon determining the direction of rotation of the standby screen image, the mobile terminal rotates the current standby screen image in the determined direction.

Figure 2:
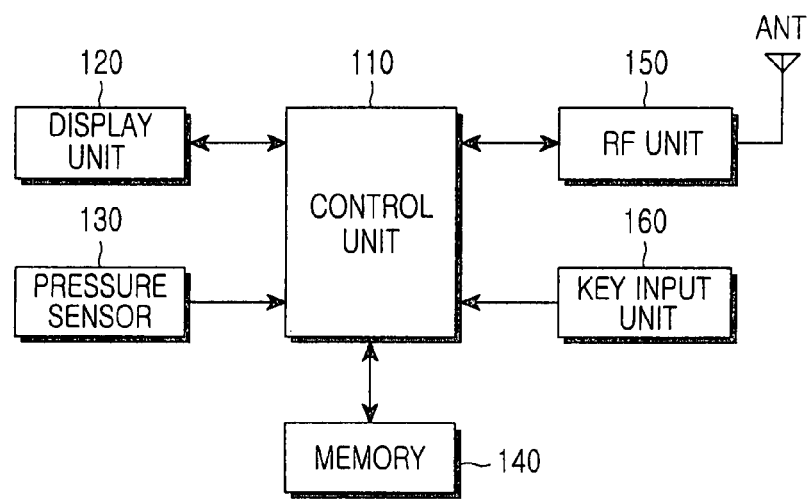
FIG. 2 is a block diagram of a mobile terminal according to a preferred embodiment of the present invention.

FIG. 2 is a block diagram of a mobile terminal according to one embodiment of the present invention. Referring to FIG. 2, the mobile terminal includes a control unit 110, a display unit 120, a pressure sensor 130, a memory 140, an RF unit 150 and a key input unit 160.

The pressure sensor 130 is mounted in the display unit 120 to detect pressure on the surface of the display unit 120. The pressure sensor 130 can be a pressure sensing sheet. The pressure sensing sheet is designed to have a predetermined number of pressure sensing areas, thereby reducing the manufacturing cost.

Figure 3A:
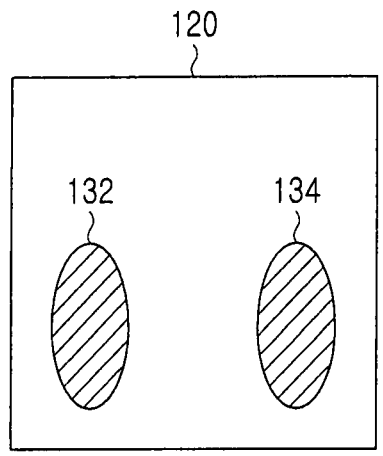
FIGS. 3A and 3B are views illustrating a pressure sensor having pressure sensing areas according to a preferred embodiment of the present invention.
Figure 3B:
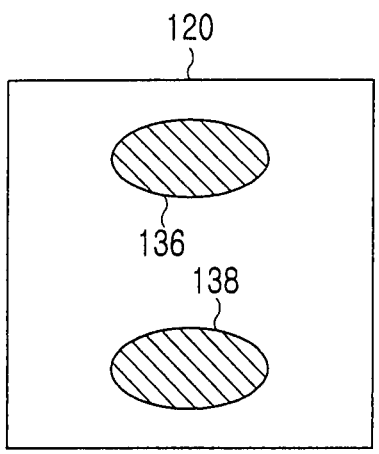

FIGS. 3A and 3B are views illustrating a pressure sensor having pressure sensing areas according to an embodiment of the present invention. The pressure sensor 130 on display 120 includes two pressure sensing areas 132 and 134 respectively, at left and right portions (substantially horizontal) the surface of the display unit 120 as illustrated in FIG. 3A. Alternatively, the pressure sensor 130 may include two pressure sensing areas 136 and 138 at upper and lower portions (substantially vertical) on the surface of the display unit 120 as illustrated in FIG. 3B. The pressure sensor 130 detects pressure on the pressure sensing areas and outputs a pressure sensing signal to the control unit 110. The pressure sensing signal includes information on the pressure sensing area at which the signal was generated.

The pressure sensor 130 can be a touch panel generally used in a touch screen. If the pressure sensor 130 is a touch panel, it outputs a touch signal generated by the user's touch to the control unit 110. In such a case, the pressure sensor 130 outputs a single touch signal generated on each pressure sensing area as a pressure sensing signal. The control unit 110 may treat signals from a single pressure sensing area as a single pressure sensing signal.

Figure 4A:
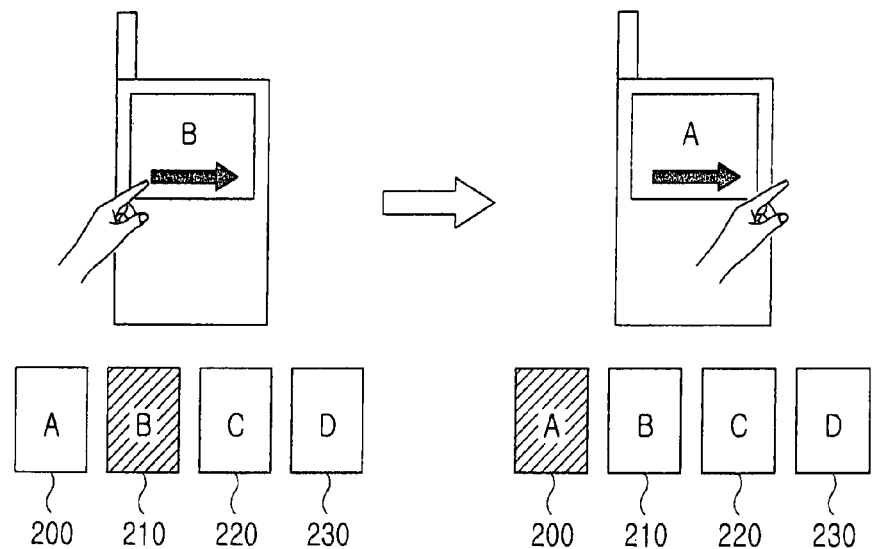
FIGS. 4A and 4B are views illustrating the loading of an image according to a standby screen image changing direction.
Figure 4B:
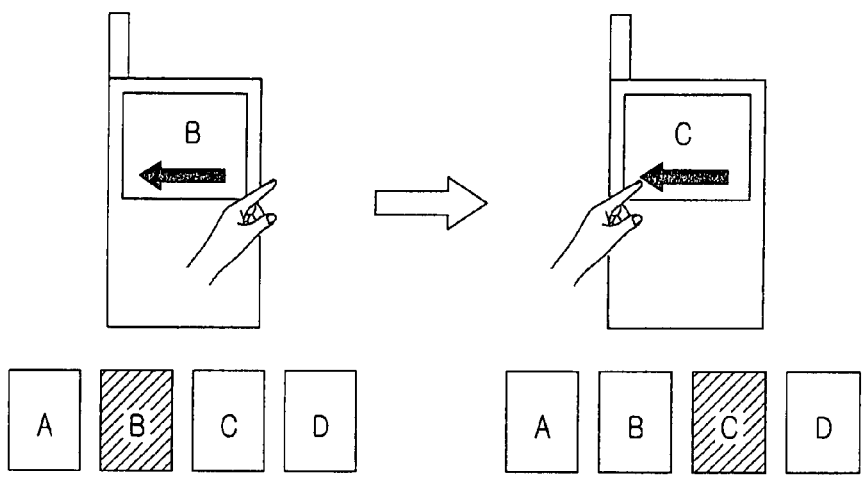

When two pressure sensing signals are received within a predetermined period of time, the control unit 110 determines the standby screen image changing direction according to the received signals. The standby screen image changing direction refers to the order the images are loaded in a plurality of images stored in the memory 140. More specifically, the memory 140 stores a plurality of images, which can be used as the standby screen, in a predetermined order. The standby screen image changing direction can be either a direction to load an image previous to the currently-displayed standby screen image or an opposite direction to load an image subsequent to the current one. FIGS. 4A and 4B are views illustrating the loading of an image according to a standby screen image changing direction.

Referring to FIG. 4A, the display unit 120 currently displays an image, e.g., B 210. The memory 140 stores images A 200, B 210, C 220 and D 230 in order. When the user's finger touches the surface of the display unit 120 and moves from the left pressure sensing area 132 to the right pressure sensing area 134, pressure sensing signals generated sequentially from the left and right pressure sensing areas 132 and 134 are inputted to the control unit 110. The control unit 110 determines the standby screen image changing direction according to the pressure sensing signals. Since the left pressure sensing signal is first generated and followed by the right pressure sensing signal, the control unit 110 determines that the standby screen image changing direction is a direction of outputting the image A 200, which is previous to the currently displayed image B 210.

Referring to FIG. 4B, when the user's finger touches the surface of the display unit 120 and moves from the right pressure sensing area 134 to the left pressure sensing area 132, a pressure sensing signal generated from the right pressure sensing area 134 and a pressure sensing signal generated from the left pressure sensing area 132 are sequentially inputted to the control unit 110. Since the right pressure sensing signal is first generated and followed by the left pressure sensing signal, the control unit 110 determines that the standby screen image changing direction is a direction of outputting the image C 220, which is subsequent to the currently displayed image B 210.

The user can intuitively recognize the standby screen image changing direction, and easily load a desired one from the images stored in the memory 140.

As explained above, the user can change the standby screen image by touching the pressure sensor 130 which has two pressure sensing areas at the left and right portions on the surface of the display unit 120. The standby screen image changing method can be applied when the pressure sensor 130 has two pressure sensing areas at the upper and lower portions on the surface of the display unit 120 as illustrated in FIG. 3B, or at any locations (for example, at the left and upper portions or at the right and lower portions) on the surface of the display unit 120. It is obvious to those skilled in the art that the same method can also be applicable when the pressure sensor 130 has three or more pressure sensing areas on the surface of the display unit 120.

Figure 5A:
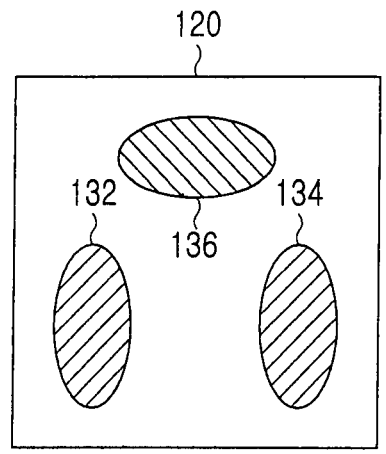
FIGS. 5A and 5B are views illustrating a pressure sensor having pressure sensing areas according to another preferred embodiment of the present invention.
Figure 5B:
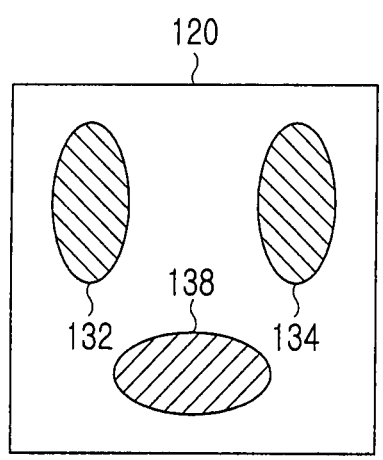

FIGS. 5A and 5B are views illustrating a pressure sensor having pressure sensing areas according to another embodiment of the present invention. The pressure sensor 130 includes three pressure sensing areas 132, 134 and 136 respectively at left, right and upper portions on the surface of the display unit 120 as illustrated in FIG. 5A. Alternatively, the pressure sensor 130 may include three pressure sensing areas 132, 134 and 138 at left, right and lower portions on the surface of the display unit 120 as illustrated in FIG. 5B.

When three pressure sensing signals are received within a predetermined period of time, the control unit 110 determines the direction of rotation of the standby screen image according to the received signals. The rotation direction refers to a direction of rotation of the standby screen image currently displayed on the display unit 120.

Figure 6:
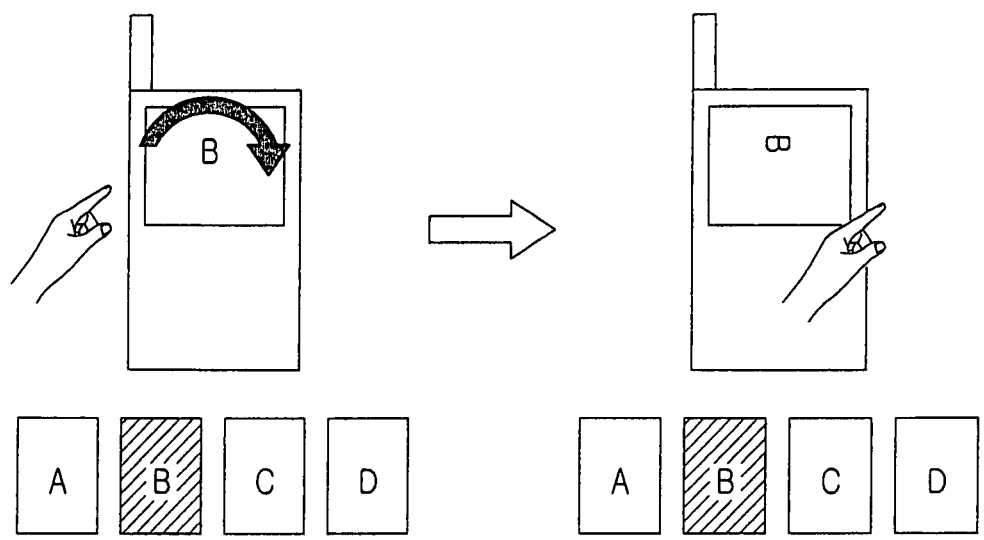
FIG. 6 is a view illustrating the rotation of a standby screen image according to a preferred embodiment of the present invention.

FIG. 6 is a view illustrating the rotation of a standby screen image according to another embodiment of the present invention. Referring to FIG. 6, the display unit 120 currently displays an image B 210, for example. It is assumed that the pressure sensor 130 includes three pressure sensing areas 132, 134 and 136 at the left, right and upper portions on the surface of the display unit 120 as illustrated in FIG. 5A.

When the user's finger touches the surface of the display unit 120 and moves from the left pressure sensing area 132 to the upper pressure sensing area 136 and then to the right pressure sensing area 134 as illustrated in FIG. 6, three pressure sensing signals are generated from the left pressure sensing area 132, the upper pressure sensing area 136 and the right pressure sensing area 134. The three pressure sensing signals are inputted sequentially to the control unit 110.

The control unit 110 determines the direction of rotation of the currently-displayed standby screen image according to the three inputted signals. Since the pressure sensing signals are generated in a clockwise direction, the control unit 110 determines that the standby screen image should be rotated in the same clockwise direction. Accordingly, the control unit 110 rotates the standby screen image by a predetermined angle, for example, 90°, in the clockwise direction.

Although not illustrated, if the user's finger moves from the right pressure sensing area 134 to the upper pressure sensing area 136 and then to the left pressure sensing area 132 on the surface of the display unit 120, the control unit 110 will determine that the standby screen image B 210 should be rotated in a counterclockwise direction, and will rotate the standby screen image B 210 by a predetermined angle in the counterclockwise direction.

According to another embodiment of the present invention, the pressure sensor 130 may include four pressure sensing areas 132, 134, 136 and 138 respectively at the left, right, upper and lower portions on the surface of the display unit 120. In such a case, the control unit 110 will determine the direction of rotation of the standby screen image according to the signals generated from the four pressure sensing areas. If the user's finger touches all of the four pressure sensing areas, the control unit 110 will rotate the standby screen image by an angle greater than the angle of rotation when pressure sensing signals are generated from three pressure sensing areas.

The RF unit 150 converts audio data or control data into an RF signal and transmits the RF signal. Also, the RF unit 150 receives an RF signal and converts the received signal into audio data or control data which will be outputted. The key input unit 160 including a plurality of alphanumeric keys and function keys outputs input data corresponding to a key pressed by a user to the control unit 110.

The display unit 120 may include an LCD (Liquid Crystal Display), a TFT (Thin Film Transistor) or an organic EL (Electroluminescence). The memory 140 connected to the control unit 110 is composed of a ROM (Read Only Memory) and a RAM (Random Access Memory) for storing a plurality of programs and data necessary to control the operations of the mobile terminal. Particularly, the memory 140 stores a plurality of images which can be used as the standby screen according to the present invention.

Hereinafter, a process of changing the standby screen in a mobile terminal having the above configuration will be explained in detail with reference to FIG. 7.

Figure 7:
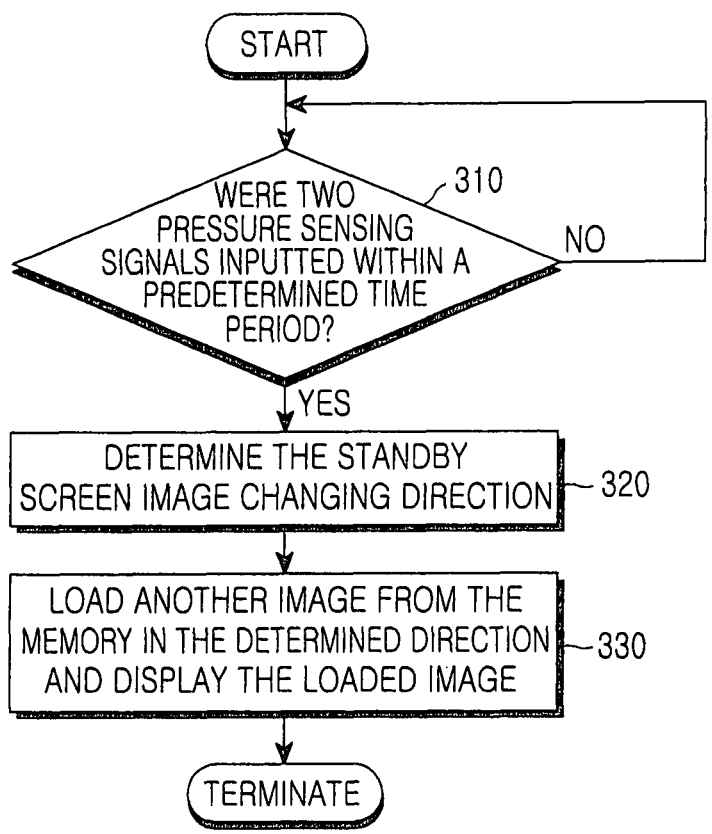
FIG. 7 is a flowchart showing a process of changing a standby screen image according to a preferred embodiment of the present invention.

Referring to FIG. 7, the control unit 110 determines whether two pressure sensing signals are inputted sequentially from two pressure sensing areas within a predetermined period of time in step 310. The control unit 110 will change the standby screen only if two pressure sensing signals are inputted within the predetermined period of time, which is not to change the standby screen when the user inadvertently touches the pressure sensing areas.

If two pressure sensing signals are received within the predetermined period of time, the control unit 110 will determine the standby screen image changing direction according to the received signals in step 320. As explained above, the standby screen image changing direction refers to an order or direction an image in a plurality of images stored in the memory 140 is loaded. More specifically, the memory 140 stores a plurality of images in a predetermined order. The control unit 110 determines whether to load an image previous to the current standby screen image or an image subsequent to the current one.

In step 330, the control unit 110 loads an image previous or subsequent to the current standby screen image from the memory 140 according to the determined direction, and displays the loaded image on the display unit 120.

An example of the present invention may be the changing of the month (or weeks) of calendar displayed on a display screen. In this case, it is assumed that calendar images are stored in the memory 140 in the order of 12 months, and that one of the 12 month images is currently displayed as the standby screen. The user can change the current standby screen image to a next month image simply by pressing or touching the pressure sensing areas on the display unit 120 in a preset direction.

Hereinafter, a process of rotating a standby screen image in a mobile terminal will be explained in detail with reference to FIG. 8.

Figure 8:
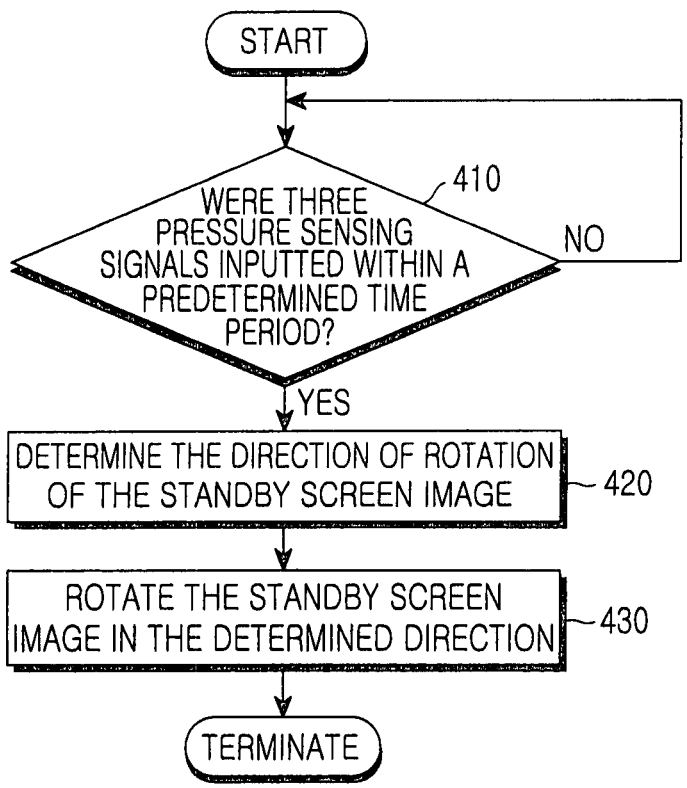
FIG. 8 is a flowchart showing a process of rotating a standby screen image according to a preferred embodiment of the present invention.

Referring to FIG. 8, the control unit 110 determines whether three pressure sensing signals are inputted within a predetermined period of time in step 410. If three pressure sensing signals are received within the predetermined period of time, the control unit 110 will determine the direction of rotation of the current standby screen image in step 420. The rotation direction refers to a direction of rotation of the standby screen image currently displayed on the display unit 120. In step 430, the control unit 110 will rotate the standby screen image by a predetermined angle in the determined direction and display the rotated image on the display unit 120.

As explained above, the user can easily change the standby screen image by touching the pressure sensing areas on the display unit 120, without the need to press keys to select menus in a hierarchical structure. The device and method according to the present invention greatly enhances the user's convenience in searching for a desired image and changing or rotating the current standby screen image.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:
1. A mobile terminal comprising:
a display unit for displaying a standby screen image;
a pressure sensor having a predetermined number of pressure sensing areas on the surface of the display unit to detect pressure on at least three non-contiguous pressure sensing areas and to generate corresponding pressure sensing signals; and
a control unit for:
sequentially receiving, while a current standby screen image representing a current background image of the mobile terminal is displayed, the at least three pressure sensing signals from the at least three non-contiguous pressure sensing areas, determining whether the received at least three pressure sensing signals have been received within a predetermined time;

determining a moving direction according to the received at least three sensing signals, said moving direction being based on an order of receiving the at least three pressure sensing signals from the at least three pressure non-contiguous sensing areas within the predetermined time, determining a rotating direction of the standby screen image according to the determined moving direction, and rotating the standby screen image currently displayed on the display unit by a predetermined angle in the determined rotating direction, wherein the control unit is configured to rotate display of the standby screen image while the mobile device remains in standby mode, and wherein the predetermined angle in the determined rotating direction is proportional to a quantity of received pressure sensing signals within said predetermined time.

2. The mobile terminal according to claim 1, wherein the at least three non-contiguous pressure sensing areas are circularly positioned on the surface of the display unit.

3. The mobile terminal according to claim 1, wherein the pressure sensor is a pressure sensing sheet designed to have the predetermined number of the pressure sensing areas.

4. A method implemented in a mobile terminal having a display unit for displaying a standby screen image and having a predetermined number of pressure sensing areas on the surface thereof, said method comprising:

detecting pressure applied to at least three non-contiguous pressure sensing areas on the surface of the display unit and outputting pressure at least three sensing signals;

sequentially receiving, while a current standby screen image representing a current background image of the mobile terminal is displayed, the at least three pressure sensing signals;

determining whether the received at least three pressure sensing signals have been received within a predetermined time;

determining a moving direction according to the received at least three sensing signals, said moving direction being based on an order of receiving the at least three pressure sensing signals from the at least three non-contiguous pressure sensing areas within said predetermined time;

determining a rotating direction of the standby screen image according to the determined moving direction; and rotating the standby screen image currently displayed on the display unit by a predetermined angle in the determined rotating direction, wherein a control unit is configured to rotate the standby screen image while the mobile device remains in standby mode, and wherein the predetermined angle in the determined rotating direction is proportional to a quantity of received pressure sensing signals within said predetermined time.

5. The mobile terminal according to claim 1, wherein the predetermined number of pressure sensing areas are exactly three non-contiguous pressure sensing areas.

6. The mobile terminal according to claim 1, wherein the predetermined number of pressure sensing areas are exactly four non-contiguous pressure sensing areas.

7. The mobile terminal according to claim 4, wherein the predetermined number of pressure sensing areas are exactly four non-contiguous pressure sensing areas.

* * * * *

UNITED STATES PATENT AND TRADEMARK OFFICE
CERTIFICATE OF CORRECTION

| | | |
|---|---|---|
| PATENT NO. | : 8,893,057 B2 | Page 1 of 1 |
| APPLICATION NO. | : 11/982689 | |
| DATED | : November 18, 2014 | |
| INVENTOR(S) | : Hee-Won Jung et al. | |

It is certified that error appears in the above-identified patent and that said Letters Patent is hereby corrected as shown below:

In the Claims

Column 7, Claim 1, Line 8 should read as follows:
--...three non-contiguous pressure sensing areas...--

Signed and Sealed this
Third Day of March, 2015

Michelle K. Lee
*Deputy Director of the United States Patent and Trademark Office*